United States Patent [19]

Saurini

[11] Patent Number: 6,059,043
[45] Date of Patent: May 9, 2000

[54] HORSESHOE

[76] Inventor: Luciano Saurini, 4, Via Pio La Torre, 46040 Ponti Sul Mincio, (Mantova), Italy

[21] Appl. No.: 09/014,721

[22] Filed: Jan. 28, 1998

[51] Int. Cl.⁷ ..................................................... A01L 1/02
[52] U.S. Cl. ................................................................ 168/4
[58] Field of Search ............................................ 168/4, 24

[56] References Cited

U.S. PATENT DOCUMENTS

| 229,103 | 6/1880 | Dennison | 168/4 X |
|---|---|---|---|
| 507,276 | 10/1893 | Kline | 168/24 |

FOREIGN PATENT DOCUMENTS

| 8210 | 6/1892 | United Kingdom | 168/24 |
|---|---|---|---|

*Primary Examiner*—Robert P. Swiatek
*Attorney, Agent, or Firm*—Thomas R. Vigil

[57] ABSTRACT

A horseshoe, comprising an inner branch (2) and an outer branch (3), reciprocally symmetrical and joining at a forward central part (4), and having a raised portion (5). The horseshoe is made of copper, which on contact with humidity releases copper sulphate, a chemical which is especially important in prevention and treatment of onycho-mycosis. The horseshoe is able to absorb vibrations to which an animal's foot is subject.

7 Claims, 1 Drawing Sheet

HORSESHOE

BACKGROUND OF THE INVENTION

1. Field of the Invention

The invention relates to a horseshoe, especially suitable for horses and equines in general.

2. Description of the Prior Art

As is well known, horseshoes are used to save the animal's hoof from the wear it would surely be subject to if unprotected, without hindering foot elaterium and without adding excessive weight to the horse's foot. At present the market offers iron, steel, aluminium and aluminium alloy shoes.

The above-mentioned available shoes are made by forging or die-casting.

The first method consists in constructing the shoe starting from rods or bars which are heated to a predetermined temperature before being bent and pressed.

The second method consists in heating the material up to softening point and forcing it under high pressure into dies.

Iron and steel are the most used metals as they exhibit those characteristics of toughness, cohesion, homogeneity and softness which are necessary for the product's destined use. They are, however, heavy.

Aluminium is little used because it is too ductile and not sufficiently resistant, leading to the need to reshoe frequently due to greater wear than would be the case with a steel or iron shoe or simply due to the natural growth of the animal's hoof.

When making aluminium shoes, generally aluminium bars are used, which are U-bent and then shaped according to a similar process to the one used for steel shoes: for this reason easily-workable alloys have to be used, which are greatly susceptible to wear, especially abrasion wear.

The above-described shoes, though functional, have some drawbacks. As has been noted previously, aluminium shoes, being light, are much less resistant, requiring frequent replacement with consequent increases in costs both of materials and labour.

Iron and steel shoes, though stronger, are heavier, causing greater fatigue in the horse, and are more rigid, limiting the capacity to absorb vibrations passed to the shoe with each contact with the ground.

What is more, it has been revealed that at present at least 50% of horses suffer from onycho-mycosis.

This high percentage is prevalently due to the fact that nowadays straw is no longer used in horse boxes, having been replaced by wood shavings, which are liable to contain the fungus giving rise to this illness.

Onycho-mycosis is a mychotic disease of the walls of equine hoofs, and is a chronic illness consisting in the formation of a cavity within the hoof. The hoof suffers in terms of vitality and becomes breakable, frail and subject to cracking. The foot deforms in the plantar ridge region, where an irregularly-shaped cavity is found, which tends to fill with horny powdery material, dried blood and various extraneous bodies. The wall is therefore thinner, rough, cracked and, if sounded with a hammer, gives a clear response. Onycho-mycosis spreads undetected in the region of the white line of the hoof, which is the zone of connection of the wall and sole tissues, and if not diagnosed in good time can originate considerable problems. Furthermore, onycho-mycosis is both an insidious and slow lesion, inasmuch as it is not easily spotted in its initial stages, since it is not functionally manifested, and gives rise to limping only at fast gaits.

This illness, which causes an alteration in the wall, puts at risk the solidity of the shoe, and can lead to serious consequences.

The treatment consists in a suitable and protective shoeing of the hoof, and a local application of antiseptics (vegetable tars, tincture of iodine, mercury bichloride, copper sulphate, etc.).

To treat onycho-mycosis, a hoof is immersed for a few minutes in a liquid composed of water and copper sulphate, with the operation being repeated for each foot and for several days in repeated cycles.

The treatment described above includes several drawbacks.

A first drawback is due to the fact that the horse is not always agreeable to being placed with its feet in a basin, and in any case the deepest-set fungi are not always eliminated. A further drawback derives from the fact that this treatment tends overall to harden the walls of the hoof, leading to further possibility of damage due to the resulting loss in ductility. For this reason, rinses after immersion are necessary to give the walls some ductility back, which are time-consuming and result in increased costs due to the specialist nature of the personnel involved in such a delicate task.

Other illnesses, such as frog-rot, are treated with drug mixtures based on copper sulphate, zinc sulphate, tincture of iodine, etc.

Often, in treating these illnesses, the shoe has to be removed, with obvious cost problems connected to the fact that the horse is thus effectively out of commission.

SUMMARY OF THE INVENTION

The present invention aims to solve the illustrated problems and overcome the difficulties outlined by providing a horseshoe able to guarantee a considerable level of resistance and ductility.

A further aim of the present invention is to provide a horseshoe which has a preventative action in the case of onycho-mycosis and which can be used with therapeutic functions with other diseases too.

A further aim of the present invention is to provide a horseshoe which is easy to work and simple to apply to the hoof.

A still further aim is to provide a horseshoe which can be made using recycled copper.

These aims and others besides, which will better emerge from the present description, are substantially achieved by a horseshoe as it will be claimed in the following.

BRIEF DESCRIPTION OF THE DRAWING

Further characteristics and advantages will better emerge from the detailed description of a horseshoe, according to the present invention, made herein below with reference to the accompanying drawing, which is provided in the form of a non-limiting example, which shows the horseshoe of the invention

DESCRIPTION OF THE PREFERRED EMBODIMENT(S)

Figure 1:
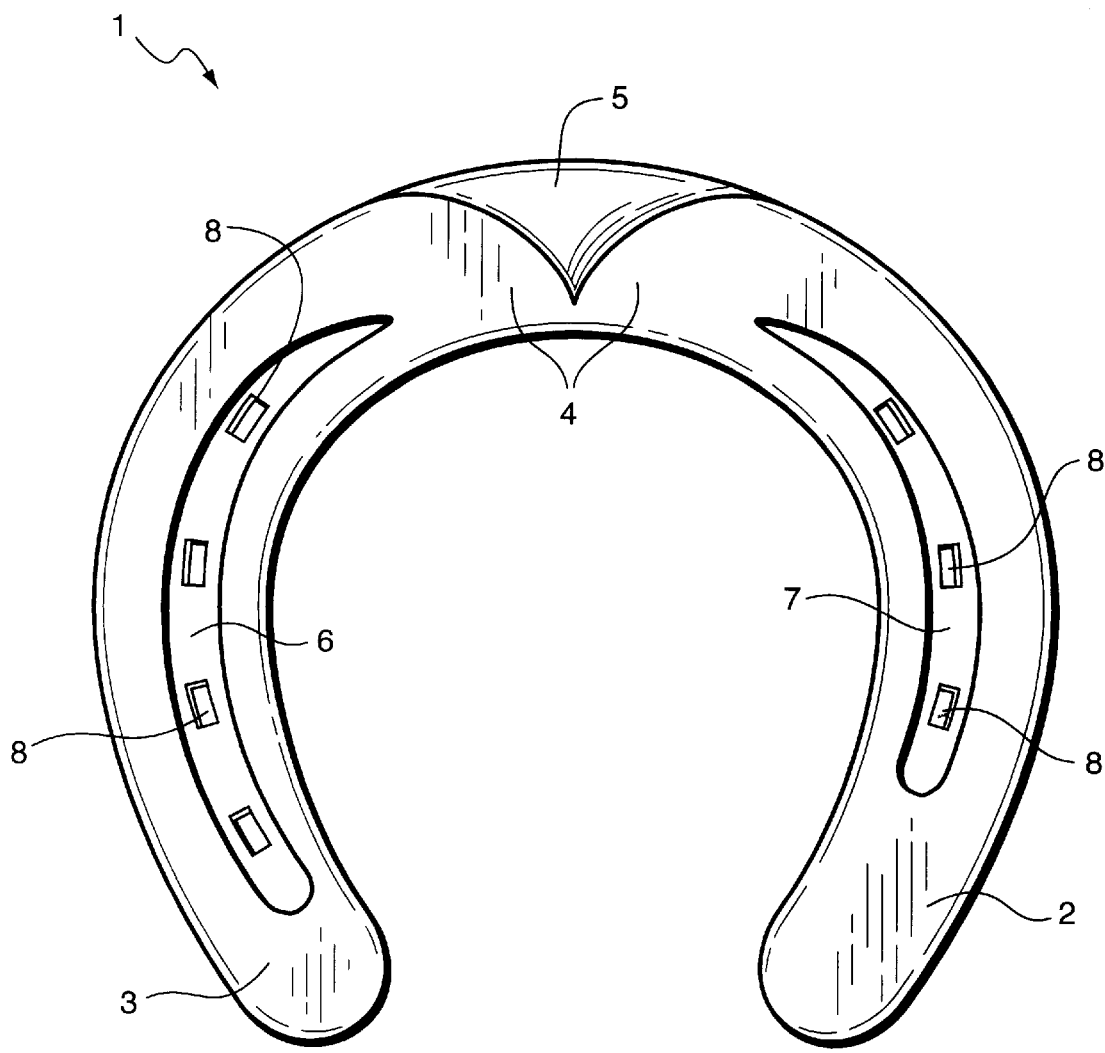

With reference to the figure, 1 denotes in its entirety a horseshoe, according to the present invention, which comprises an inner branch 2 and an opposite and symmetrically-shaped outer branch 3. The inner branch 2 and the outer branch 3 join at a forward central part 4 of the shoe, where there is also a raised portion 5, or barb, which serves as a rest for the shoe as well as functioning as a stop for the shoe and hoof.

Also, the shoe 1 exhibits a first recess 6 on the external branch 3 and a second recess 7 on the inner branch 2, which function as anti-slip devices as well as housing the nails fixing the shoe 1 to the hoof. Both the first 6 and the second 7 recesses afford a plurality of holes 8. The horseshoe of the present invention is made of copper, copper alloys or brass.

In the present embodiment, the horseshoe 1, and in particular the posterior shoe, can be raised, i.e. varied in thickness, meaning thinner in front (the forward central part 4) and thicker at the back (the inner and outer branches 2 and 3) so that the horse's footfall is stable both on hard and soft grounds, differently to the prior art, where studs are used to contain the horse's weight. The conformation of the present invention is considerably advantageous for the horse's tendons, as twists and sprains are avoided, as often happened in the prior art due to the fact that the studs sank on softer ground.

Following the above prevalently structural description, the invention will now be functionally described. Preparation of a copper shoe is much faster than forging an iron or steel shoe.

Copper, which fuses at a lower temperature, is workable in a shorter time and, being an excellent heat conductor, keeps to the required working temperature for a longer time. Further, less energy is consumed in bringing it up to the working temperature, as, for example, between 600° and 700° C. are sufficient to make it workable, while for iron and steel about 1000° C. are needed.

Copper is also a softer and more ductile material than iron or steel, and therefore much easier to work, with less force and less time required to obtain the finished piece.

In addition to the above, a copper shoe can be applied hot to the hoof, unlike shoes in other materials.

This means that shorter operative times for preparation are needed, and, moreover, the temperature is a definite help in defeating onycho-mycosis. Thus the invention achieves its set aims. The horseshoe made according to the present invention is very resistant to wear, indeed is equal to steel in this respect, and is especially able to absorb the painful vibrations the hoof receives at each impact with the ground.

This is very important in improving the horse's movements, allowing for greater agility in lifting the front feet and affording faster and more precise movements.

The shoe of the invention can be used for all kinds of sporting and non-sporting activities, such as for example galloping, trotting, polo, cross-country, dressage, riding, walking, jumping, and so on.

The horseshoe of the invention is particularly useful in aiding preventative treatment of onycho-mycosis since the copper in the shoe releases an oxide which when in contact with humidity or water transforms into a sulphate.

The release of sulphate continuously treats the plantar of the hoof, preventing onset of the disease in a healthy horse.

Apart from the preventative action, the shoe of the invention treats onycho-mycosis and other illnesses requiring copper sulphate, thus aiding the veterinary surgeon's work.

Thus illnesses are both prevented and treated simply and continuously, without having to use methods contained in the prior art.

With this horseshoe, made of copper or copper alloy, the preventative aspect means that there is no longer the risk of onset of a disease which can only be identified when in an advanced state of diffusion, i.e. at a dangerous stage.

Further, the application of a copper horseshoe hardens the plantar part, with indubitable advantages since it is rendered less delicate due to the constant presence of the copper sulphate.

The shoe of the invention, being lighter than the prior art, advantageously reduces the fatigue suffered by the horse.

Further, the shoe is very much more ductile, making it easier to work and quicker to make and apply to the animal's hoof. In addition to this, in comparison to ordinary steel horseshoes, the present shoe can if necessary be made wider so as to offer a better coverage of the plantar region, or indeed other special forms can be made for various needs, whether technical, porting or for purposes of treatment.

A further advantage of the shoe of the invention is that, as it is better able to absorb the vibrations the horse's foot is subject to, it is particularly health-preserving in that it reduces the risk of tendinitis, problems connected to the quick of the foot, osteitis and inflammations in general.

All of this leads to considerable savings in the cost and keep of the horse.

Naturally, numerous modifications and variations can be brought to the invention, all entering within the ambit of the inventive concept which characterizes it.

I claim:

1. A generally C-shaped horseshoe, comprising a first or inner branch or leg (2), a second or outer branch or leg (3), and a bight or central portion (4) connecting said legs or branches (2) and (3) together, and having at said forward bight or central portion (4) a raised portion (5) on a bottom of said horseshoe serving as a stop for the shoe and hoof and said horseshoe being made substantially of copper, such that a hores's hoof is able to contact said copper horseshoe to inhibit fungus induced disease.

2. The horseshoe of claim 1, wherein said horseshoe is made of a copper alloy comprising primarily copper.

3. The horseshoe of claim 1, wherein said horseshoe exhibits a smaller width at a front part thereof and a greater width at a back part thereof, corresponding to said inner branch (2) and said outer branch (3).

4. The horseshoe of claim 1, wherein each leg or branch (2, 3) has an arcuate recess (6,7) on the bottom thereof.

5. The horseshoe of claim 4, wherein said horseshoe has at least three openings (8) through the inner leg or branch (2) opening into said recess (6).

6. The horseshoe of claim 4, wherein said horseshoe has at least four openings (8) through the outer leg or branch (3) opening into said recess (6).

7. A generally C-shaped horseshoe, comprising a first or inner branch or leg (2), a second or outer branch or leg (3), and a bight or central portion (4) connecting said legs or branches (2) and (3) together, and having at said forward bight or central portion (4) a raised portion (5) serving as a stop for the shoe and hoof and said horseshoe being made from a material consisting essentially of copper, such that a hores's hoof is able to contact said copper horseshoe to inhibit fungus induced disease.

* * * * *